United States Patent [19]
Lampe et al.

[11] Patent Number: 5,097,659
[45] Date of Patent: Mar. 24, 1992

[54] AIRFRAME POWER UNIT USING STORED AIR AND JET FUEL

[75] Inventors: Steven W. Lampe; Paul A. Schuh; Sven B. Sjoberg; Timothy David, all of San Diego,, Calif.

[73] Assignee: Sundstrand Corporation, Rockford, Ill.

[21] Appl. No.: 450,671

[22] Filed: Dec. 14, 1989

[51] Int. Cl.$^5$ .............................................. F02C 9/50
[52] U.S. Cl. .................................................. 60/39.27
[58] Field of Search ............. 60/39.141, 39.142, 39.27, 60/39.281, 39.29, 240, 727

[56] References Cited

U.S. PATENT DOCUMENTS

| | | | |
|---|---|---|---|
| 2,611,239 | 9/1952 | Briggs | 60/39.27 |
| 3,427,803 | 2/1969 | Greiner | 60/39.29 |
| 4,777,793 | 10/1988 | Weigand et al. | |
| 4,815,277 | 3/1989 | Vershure | 60/39.142 |

FOREIGN PATENT DOCUMENTS

2136184 1/1973 Fed. Rep. of Germany ..... 60/39.27

Primary Examiner—Louis J. Casaregola
Attorney, Agent, or Firm—Antonelli, Terry, Stout & Kraus

[57] ABSTRACT

An airframe power unit for producing a power output in accordance with the invention includes a combustor (16) having a fuel injector (58) which injects fuel into the combustor which is combusted to form a gas stream (18); a turbine (12) driven by the gas stream from the combustor for producing the power output; an air supply (20) for providing pressurized gas containing oxygen blown down from a storage vessel (22) to the combustor which is used in the combusting of the fuel; a valve (24) disposed in the gas supply which controls a rate of supply of gas to the combustor in response to the control signal applied to the valve to cause the turbine to operate with a constant operational characteristic; a control for providing at least one control value ($P_S$ and $S_S$) with each value specifying a desired operational parameter for use in producing the constant operational characteristic; a sensor (31 or 68) for sensing at least one operational parameter of the turbine; a difference circuit (32, 204, 404 or 504) for producing the control signal as a function of a difference of at least one control value and a corresponding sensed operational parameter; and a fuel control (50) for controlling the rate of injection of fuel by the fuel injector into the combustor.

10 Claims, 6 Drawing Sheets

AIRFRAME POWER UNIT USING STORED AIR AND JET FUEL

DESCRIPTION

1. Technical Field

The present invention relates to airframe systems for generating auxiliary and emergency power.

2. Background Art

Emergency power units (EPU) are utilized by airframes for generating emergency hydraulic and/or electrical power when the jet propulsion engines have flamed out for maintaining control of the airframe at altitudes where the air breathing auxiliary power unit (APU) will not operate. An APU is used for generating emergency power and power on the ground such as for starting. EPUs are typically used in high performance aircraft at altitudes above 40,000 feet where insufficient air exists to generate sufficient power with an air breathing APU. An integrated power unit (IPU) is an integrated system which performs the functions of an EPU and an APU. An EPU and an IPU when generating emergency power utilize a combustor which decomposes a stored fuel to generate a gas stream which powers a rotor of a turbine which drives a hydraulic and/or electrical power generating unit for generating the aforementioned emergency power to maintain control of the airframe during flameout or starting of the propulsion engine(s).

EPUs exist which combust a mixture of gas stored in a high pressure vessel which may be air or oxygen and jet fuel to generate the aforementioned gas stream for driving the turbine which provides power for driving the hydraulic and/or power generating units An example of such a system is disclosed in U.S. Pat. No. 4,777,793. The emergency power unit disclosed in the '793 patent runs with in air to fuel ratio which is fuel rich. The '793 patent discloses that fuel rich operation minimizes the amount of compressed air required and minimizes the size of the high pressure air tank and additionally maximizes the amount of energy which is able to provide useful power due to the high temperatures of the combustion gas produced. The EPU disclosed in the '793 patent is not described as operating with a constant speed or power characteristic.

The assignee of the present invention manufactures combustors utilized in EPUs and IPUs which have a primary injector including a control valve regulating the flow of fuel to a primary injector and an air flow control which maintains a stoichiometric air to fuel ratio in a primary combustion zone and a secondary fuel injector which injects fuel to cool the resultant combustion product gas stream prior to impingement on the turbine rotor to a temperature which will not damage the turbine rotor. Systems manufactured by the assignee contain a control system for regulating the temperature of the high pressure gases exiting from the combustor. Two forms of temperature control have been used with the first being a closed loop control of the combustor exit temperature and the second being a control maintaining an overall constant primary plus secondary injector air to fuel ratio. The closed loop control compares a sensed temperature of the gas discharged from the combustor with a set value specified by a system controller with a difference being computed between the set temperature and the sensed temperature which difference is utilized to control the quantity of fuel injected by the secondary injector to maintain a constant exit temperature. The combustors manufactured by the assignee of the present invention do not have control systems for maintaining a constant speed rotation of the turbine rotor or outputting constant power from the turbine rotor. There are applications for EPUs and IPUs in which maintaining constant speed or power are desirable which has not been achievable with the assignees combustors as utilized in EPUs and IPUs to date.

DISCLOSURE OF INVENTION

The present invention provides an airframe power unit for producing a power output for EPU and IPU applications. With the invention the rate of flow of air to the combustor or the rate of fuel injected into the combustor is controlled to maintain a constant operational characteristic. As used herein the terminology "constant operational characteristic" means operation of a turbine in a power unit for producing a power output in which the rotor of the turbine is controlled to rotate at a constant speed or is controlled to output constant power. The present invention achieves the aforementioned constant operational characteristic by control of the quantity of air provided to a combustor or the quantity of fuel injected into the combustor by providing a control loop in which a sensed operational parameter of the turbine is compared with a set value to generate a difference signal which controls either the rate of air flow or fuel flow. In applications where air flow is controlled as an independent variable for producing the aforementioned constant operational characteristic the quantity of fuel injected into the injector is also controlled by a control system for maintaining a constant air to fuel ratio of the fuel which is combusted in the combustor. In applications where the quantity of fuel injected into the combustor which is combusted is controlled as an independent variable to maintain a constant operational characteristic the quantity of air flowing to the combustor is also controlled in accordance with an air control system which maintains a constant air mass flow.

An airframe power unit for producing a power output used in an airframe in accordance with the invention includes a combustor having a fuel injector which injects fuel into the combustor which is combusted to form a gas stream; a turbine driven by the gas stream from the combustor for producing the power output; a fuel supply supplying fuel to the injector including a fuel control valve which controls a rate of supply of fuel to the combustor in response to a control signal applied to the valve to cause the turbine to operate with a constant operational characteristic; a control for providing a least one control value with each value specifying a desired operational parameter controlling the turbine to operate with the constant operational characteristic; a sensor for sensing at least one operational parameter of the turbine; a control signal generator for producing the control signal as a function of a difference between the at least one control value and a corresponding sensed operational parameter; a gas supply for providing pressurized gas blown down from a storage vessel containing oxygen to the combustor which is used in the combusting of the fuel; and a gas control containing the rate of flow of gas to the combustor. The at least one operational parameter may be a sensed speed of rotation of the turbine, the at least one control value may be a desired speed of operation of the turbine rotor and the operational characteristic is a constant speed of rotation of the turbine. Alternatively, the at least one operational parameter may be a sensed combustor pressure and the control value may be a desired constant combustor pressure. The combustor has a primary fuel injector for injecting fuel which is combusted in the combustor and a secondary fuel injector for injecting fuel into the gas stream to lower the gas stream temperature; and further the invention includes a control for controlling the gas stream temperature to maintain a constant gas stream temperature into the turbine by controlling the injection of fuel into the secondary fuel injector; and the at least one operational parameter further includes a sensed speed of rotation of the turbine, the at least one control value further includes a desired constant combustor temperature and the operational characteristic is a constant power output from the turbine. The power unit of the present invention may be utilized as an emergency power unit or an integrated power unit. When used as an emergency power unit the fuel may be jet propulsion engine fuel and the gas supply may be at least one vessel storing compressed air. When used as in integrated power unit the fuel may be jet propulsion engine fuel and the gas supply may be at least one vessel storing compressed air.

The invention further includes a restriction disposed in the fuel supply between the fuel control valve and the injector; a fuel pressure sensor for sensing the fuel pressure upstream from the restriction; and a combustor pressure sensor for sensing the gas pressure in the combustor. The air control includes a controller responsive to the sensed pressures, for calculating the fuel injected by the primary injector and generating a control signal controlling the rate of gas flow into the combustor as a function of the calculated fuel flow to maintain a constant gas to fuel ratio. The controller calculates a value for the equation $$K * \sqrt{P_F - P_C} * \text{(gas to fuel ratio)}$$

which is a function of the gas control signal where K is a constant, $P_F$ is the sensed fuel pressure and $P_C$ is the sensed combustor pressure and the gas to fuel ratio is a desired ratio for the combustor.

An airframe power unit for producing a power output used in an airframe in accordance with the invention includes a combustor having a fuel injector which injects fuel into a combustor which is combusted to form a gas stream; a turbine driven by the gas steam from the combustor for producing the power output; a gas supply for providing pressurized gas containing oxygen blown down from a storage vessel to the combustor which is used in the combusting of the fuel; a valve disposed in the gas supply which controls a rate of supply of gas to the combustor in response to a control signal applied to the valve to cause the turbine to operate with a constant operational characteristic; a control for providing at least one control value with each value specifying a desired operational parameter used in controlling the turbine to operate with the constant operational characteristic; a sensor for sensing at least one operational parameter of the turbine as an electrical signal; a control signal generator for producing the control signal as a function of a difference between the at least one control value as an electrical signal and a corresponding sensed operational parameter as an electrical signal with the sensed operational parameter being one of a sensed speed of rotation of the turbine or combustor pressure; and a fuel control controlling the rate of injection of fuel by the fuel injector into the combustor. The at least one operational parameter may be the sensed speed of rotation of the turbine, the at least one control value may be a desired speed of operation, and the operational characteristic may be a constant speed of rotation of the turbine. Alternatively, the at least one operational parameter may be the sensed combustor pressure and the control value may be a desired constant combustor pressure. The combustor has a primary fuel injector for injecting fuel which is combusted in the combustor and a secondary fuel injector for injecting fuel into the gas stream to lower the gas stream temperature; and the invention further includes a control for controlling the gas stream temperature to maintain a constant gas stream temperature into the turbine by controlling injection of fuel into the secondary fuel injector; and the at least one operational parameter further includes a sensed speed of rotation of the turbine, the at least one control value further includes a desired constant combustor temperature and the operational characteristic is a constant power output from the turbine.

The power unit may be used in applications as an emergency power unit or an integrated power unit. When the power unit is used as an emergency power unit, the fuel may be jet engine propulsion fuel and the gas supply has at least one vessel storing compressed air. When the power unit is used as an integrated power unit, the fuel may be jet engine propulsion fuel and the gas supply has at least one vessel storing compressed air.

The invention further includes a choked venturi disposed in the gas supply between the valve and the combustor; a temperature sensor and a pressure sensor respectively for sensing temperature and pressure of gas flowing in the gas supply between the valve and the combustor; and wherein the fuel control includes a controller, responsive to the sensed temperature and sensed pressure, for calculating the gas flowing into the combustor and generating a control signal controlling a rate of fuel injection by the primary injector as a function of the calculated gas flow to maintain a constant gas to fuel ratio. The controller for calculating and generating calculates a value for the equation $$\frac{P * K}{\sqrt{T}} * \text{(fuel to gas ratio)}$$

which is a function of the control signal wherein P is the sensed pressure, T is the sensed temperature, K is a constant and the fuel to gas ratio is desired ratio for the combustor.

DISCLOSURE OF THE INVENTION

Figure 1:
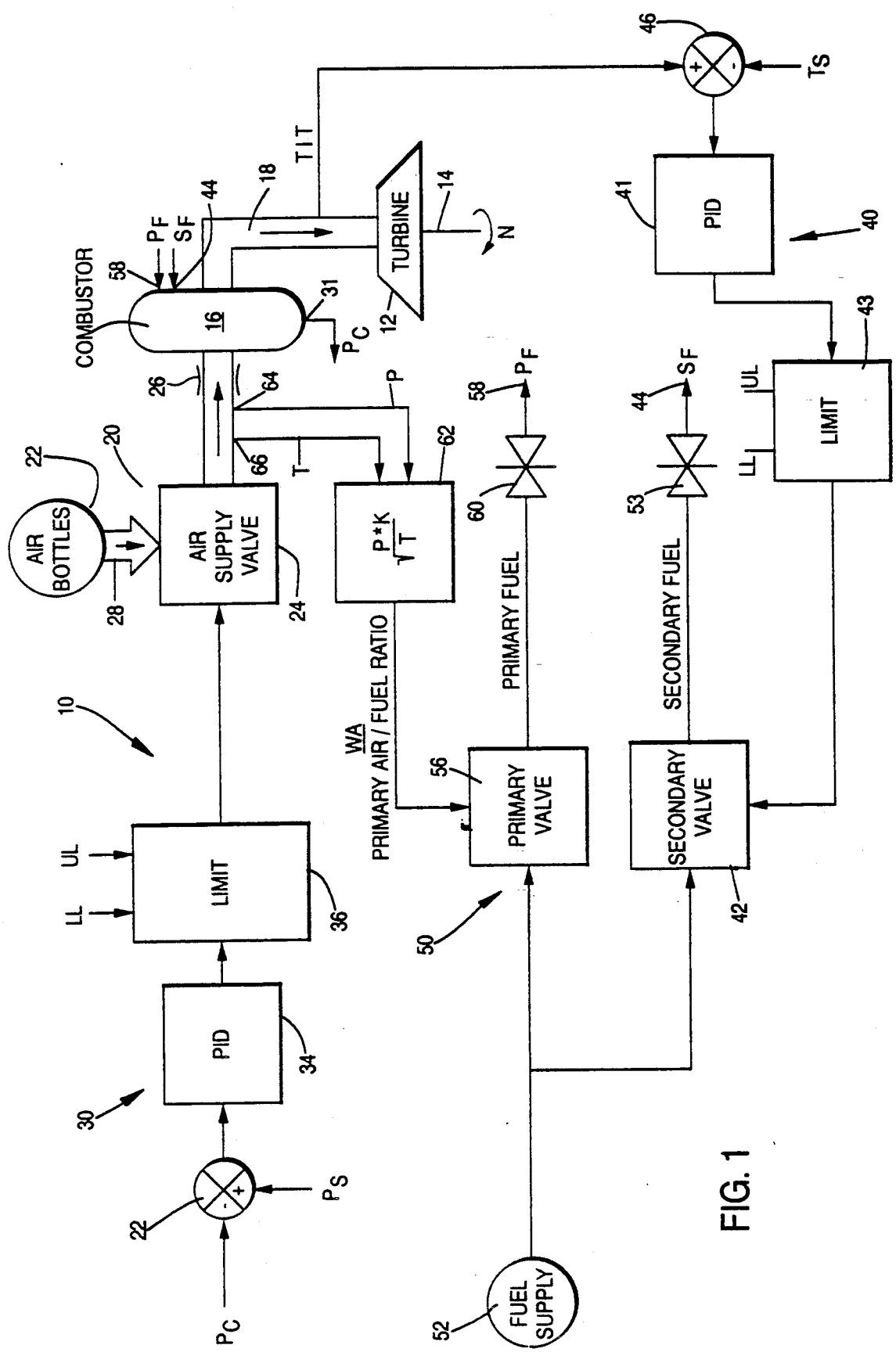
FIG. 1 illustrates a block diagram of a first embodiment of the present invention.

FIG. 1 illustrates a first embodiment 10 of the present invention. The first embodiment functions to vary the rate of airflow to combustor 16 as an independent variable to produce constant output power from turbine 12 driven by the combustor. The first embodiment may be utilized in applications in airframes as an EPU or as the EPU part of an IPU. The first embodiment produces constant output power from combustor 16 which is coupled through gas duct 18 to an EPU or EPU part of an IPU turbine. This turbine may provide power to a gearbox which in turn may be used to start the main engine and/or provide electrical and/or hydraulic power generator (not illustrated). Control of the turbine 12 to output constant power requires that the temperature as indicated by TIT of the gas stream impinging on the rotor of the turbine 12 is constant and the combustion pressure within the combustor 16 is also constant.

The air supply 20 of the first embodiment 10 is comprised of one or more air storage bottles 22 which store compressed air at a pressure such as 3500 p.s.i. that is blown down to combustor 16 through an air supply valve 24 regulating the quantity of air flowing to the combustor 16, a choked venturi 26 and conduit 28 which connects air bottles 22 to the combustor 16 and which contains the air supply valve and choked venturi. A choked venturi restricts the flow of air in the conduit 28 downstream from the venturi such that the upstream pressure is at least 120% as great as the downstream pressure. When the aforementioned condition is maintained the combustion pressure generated by ignition inside the combustor does not effect the mass flow upstream of the venturi. The air mass flow to the combustor is a control variable which must be accurately controlled to provide the constant operational characteristic of constant speed or constant power output.

Embodiment 10 of the present invention illustrated in FIG. 1 utilizes a pressure control loop 30 and a temperature control loop 40 to produce a constant output power. The control loop 30 compares a sensed combustor pressure $P_C$ sensed by combustor pressure sensor 31 with a set combustor pressure $P_S$ which is specified by the system control (not illustrated). The set combustor pressure $P_S$ may be provided by storage from a memory or inputted by a suitable control or other conventional means. A difference signal is calculated by subtractor 32 which is used to control the degree of opening of air supply valve 24 as part of maintaining a constant output power. The difference signal from the subtractor 32 is applied to a PID controller 34 which applies a necessary system proportional, integral and differential amplification to the difference signal to maintain a constant power output. The relative gain of the proportional, integral and differential terms may be varied in accordance with well known procedures. The output of the PID controller 34 is applied to a limit circuit 36 which limits the output of the PID controller 34 between an upper and lower limit UL and LL. The temperature control loop 40, which has been referred to in the prior art discussed above, maintains the turbine inlet temperature (TIT) constant by controlling the quantity of fuel flowing through secondary valve 42 which controls the rate of fuel injection by fuel injector 44 that is downstream from the primary combustion zone of the combustor 16. The temperature loop 40 includes a PID controller 41 which applies a necessary system proportional, integral and differential amplification and a limit circuit 43 which limits the output of the PID controller 41 between an upper and lower limit UL and LL. The turbine inlet temperature TIT is subtracted from a set temperature $T_S$ provided by the controller which is the desired turbine inlet temperature. The difference signal produced by subtractor 46 is applied through the PID controller 41 and limit circuit 43 to the secondary valve 44 as the control signal to maintain the constant turbine inlet temperature.

The fuel supply 50 contains a source of jet propulsion engine fuel 52 which may be the fuel tanks of the airframe. The aforementioned secondary valve 42 controls the rate of flow of fuel to the secondary valve 44 for temperature control of the combustion gas impinging on the turbine rotor. An on/off valve 53 permits the selective shut-off of fuel flow to the secondary injector 44. A primary fuel valve 56 controls the rate of flow of primary fuel to primary fuel injector 58 to maintain stoichiometric combustion. An on/off valve 60 permits the selective shutoff of the fuel flow to the primary fuel injector 58. The stoichiometric combustion of fuel injected by the primary fuel injector 58 is maintained by a control signal applied to the primary valve 56 which is produced by control 62 which calculates a solution to the equation $$\frac{P \cdot K}{\sqrt{T}} * \text{(fuel to gas ratio)}$$

wherein P is the sensed pressure in the air flowing upstream from the choked venturi 26 sensed by pressure transducer 64 which may be any conventional pressure transducer, T is the temperature sensed in the air flowing upstream of the choked venturi by temperature sensor 66 which may be any conventional temperature sensor, and K is a constant determined by the system. The output of the control 62 is a signal which maintains the fuel flow in the primary fuel circuit through the primary fuel injector 58 to produce stoichiometric combustion in the combustor in accordance with the assignees commercially available combustors.

Embodiment 10 can be further simplified by replacing the modulating primary valve 56 and secondary valve 42 with fixed flow valves. This eliminates the requirement for pressure sensor 64, temperature sensor 66, and control function 62, 46 and 40, by regulating the air supply valve 24 to maintain a constant combustor pressure 31 or "relatively" constant gas to fuel ratio and combustor exit temperature is maintained.

Figure 2:
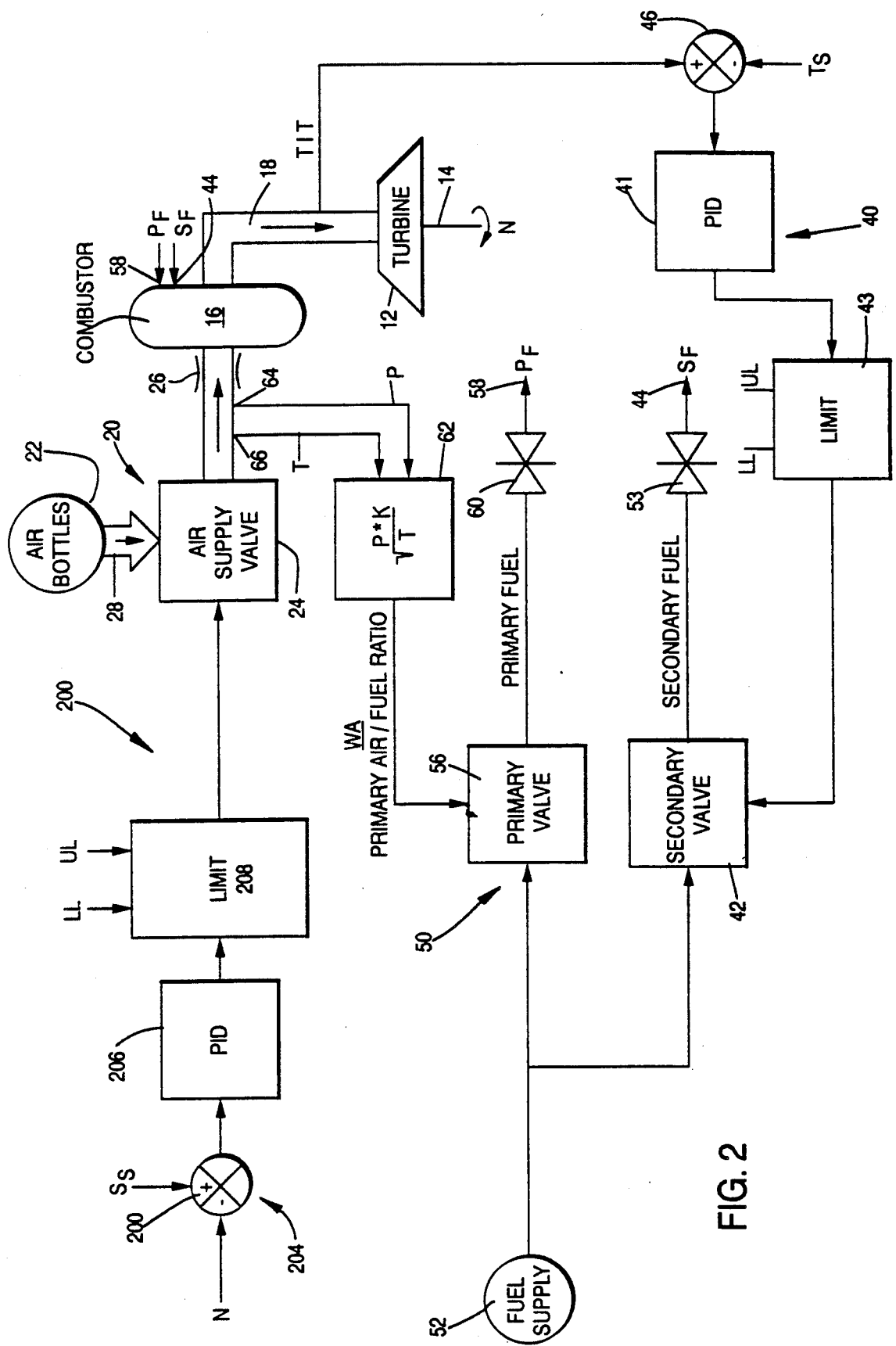
FIG. 2 illustrates a block diagram of a second embodiment of the present invention.

FIG. 2 illustrates a second embodiment 200 of the present invention. Like parts are identified by like reference numerals in FIGS. 1 and 2. The second embodiment functions to vary the rate of airflow to combustor 16 as an independent variable to produce a constant rotational velocity on shaft 14. Constant rotational velocity of the shaft 14 of the turbine 12 is produced by regulating the combustor pressure of the gas stream impinging on the rotor 12 being maintained constant. The second embodiment 200 differs from the first embodiment 10 in that the air supply valve 24 is controlled by a speed control loop 202. A difference signal equal to the difference between the actual speed N of the turbine rotor 14 and a set speed $S_s$ which is specified by the system controller is produced by subtractor 204. PID controller 206 provides proportional, integral and differential amplification of the difference signal with the relative gains of the proportional, integral and differential terms being set in accordance with the system to produce constant velocity operation. Limit circuit 208 limits the output signal from the PID controller 206 within upper and lower limits. The output signal from the limit circuit 208 is applied to the air supply valve 24 to control the flow of air to the combustor from the air bottles 22 to maintain constant speed operation which produces a constant rotational velocity of the turbine rotor 14 and a constant turbine inlet temperature.

Figure 3:
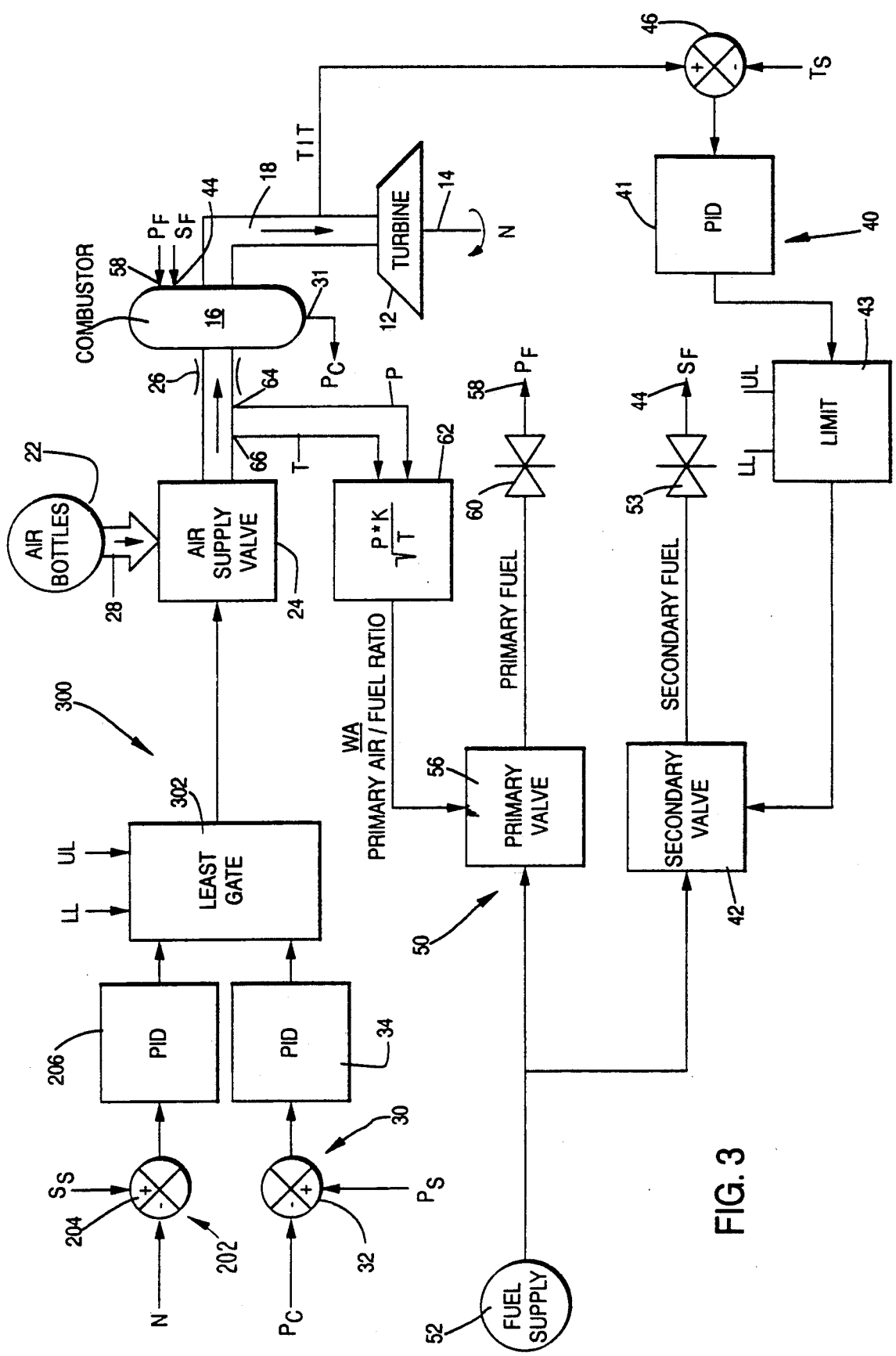
FIG. 3 illustrates a block diagram of a third embodiment of the present invention.

FIG. 3 illustrates a third embodiment 300. Like reference numerals identify like parts in FIGS. 1–3. In steady state operation, the third embodiment 300 functions to vary the rate of airflow to combustor 16 as an independent variable to produce a constant rotational velocity on shaft 14. The embodiment of FIG. 3 utilizes a constant pressure control loop 30 for accelerating the turbine rotor up to the set speed $S_S$. Least gate 302 functions to output the lesser in magnitude of the output signals of the PID controllers 34 and 206 and further limit the control signal applied to air supply valve 24 between upper and lower speed and pressure limits. Each of the control loops 30, 40 and 202 operate as described above with respect to FIGS. 1 and 2.

Embodiments 10, 200 and 300 can use a constant overall air/fuel method for secondary fuel control.

Figure 4:
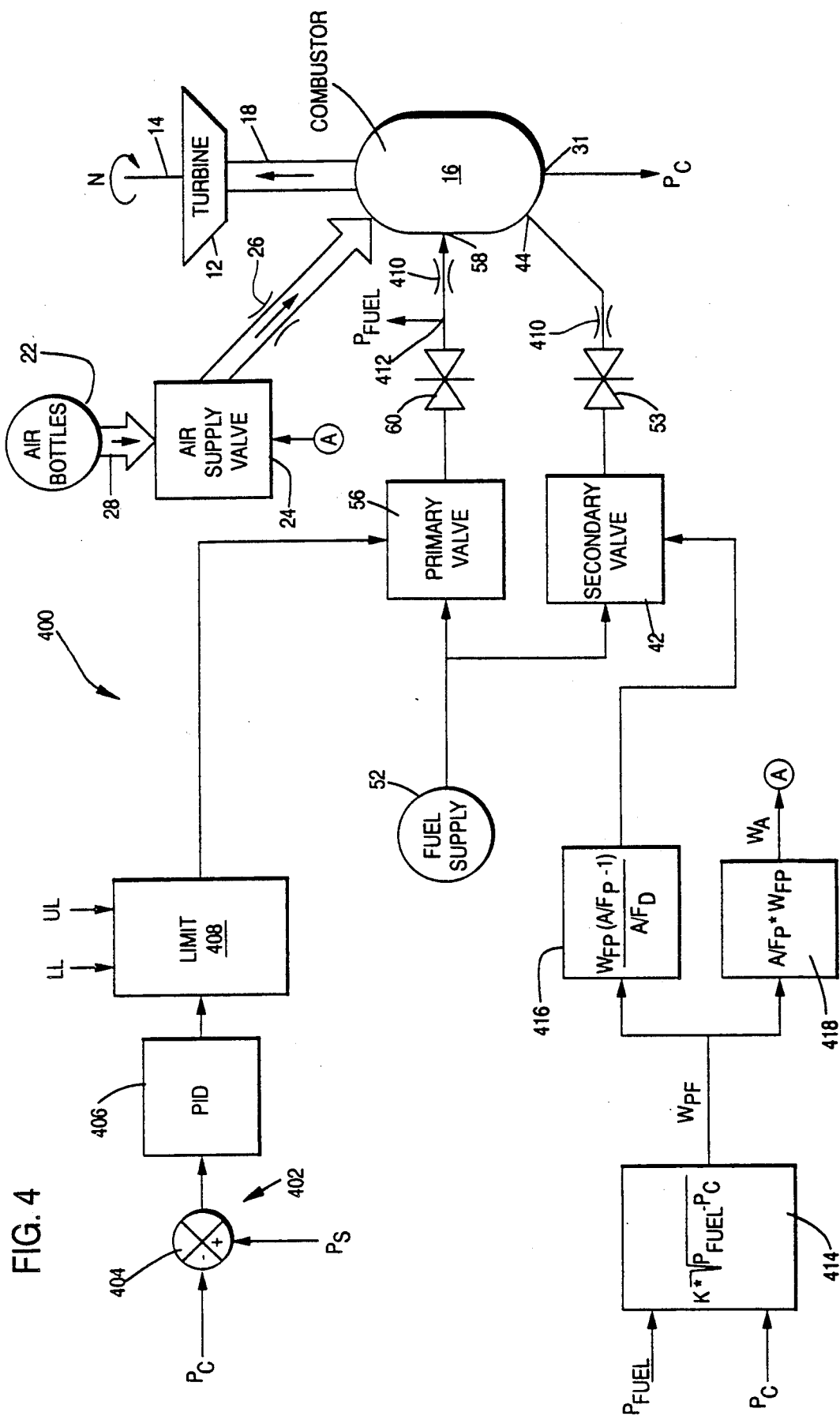
FIG. 4 illustrates a block diagram of a fourth embodiment of the present invention.

FIG. 4 illustrates a fourth embodiment 400 of the present invention. The fourth embodiment 400 functions to vary the rate of fuel flow to combustor 16 as an independent variable to produce a constant output power from turbine 12 driven by the combustor. Like reference numerals identify like parts in FIGS. 1–4. The embodiment of FIG. 4 differs from the embodiment of FIG. 1 in that the flow of fuel from the primary fuel valve 56 is used as an independent variable in the control of the turbine 12 in outputting constant power from the output shaft 14. The flow of fuel injected by the primary injector 58 is controlled by pressure control loop 402. The pressure control loop 402 generates an error signal equal to the difference between the actual pressure in the combustor $P_C$ sensed by sensor 31 and the desired pressure in the combustor $P_S$. The error signal produced by subtractor 404 is applied to a PID controller 406 with the proportional integral and differential gains being determined by the characteristics of the system. Limit circuit 408 maintains the output of the PID controller 404 between upper and lower limits. Additionally, the flow of fuel through the secondary valve 42 is controlled to maintain a constant gas to fuel ratio necessary for producing a constant power output on the output shaft from the rotor 14 of the turbine 12.

The control of the fuel injected by the secondary injector 44 is controlled by a control signal applied to the secondary valve 42. The fuel pressure $P_{FUEL}$ upstream from restriction 410 is sensed by pressure transducer 412 which may be of any conventional design. Computation circuit 414 calculates the primary fuel flow $W_{PF}$ by computing a solution to the equation $$K * \sqrt{P_{FUEL} - P_C}.$$

The effect of fuel temperature could be accounted with the addition of a fuel temperature sensor. This would improve accuracy over a wide range of temperatures. Different types of fuel flow sensing methods may also be incorporated. The output primary fuel flow $W_{PF}$ is applied to computation circuit 416 which multiplies the primary fuel flow WPF times the quantity of the air to fuel ratio $A_{FP}$ of the primary injector minus one divided by the overall air to fuel ratio $A_{FD}$ of the primary and secondary fuel injectors 58 and 54 respectively. The overall output signal produced by the computation circuit 416 is applied as the control signal to the secondary valve 42 for maintaining a constant temperature output. Control of the air supply valve 24, which is not the independent variable for producing a constant operational characteristic, is produced by computation circuit 418 which multiplies the primary fuel flow $W_{PF}$ times the primary air to fuel ratio $A_{FP}$ to compute the mass air flow $W_A$ which is the flow necessary to produce stoichiometric combustion in the combustor 16.

This system can be simplified by making the air supply valve 24 and the secondary valve 42 nonmodulating. This eliminates fuel pressure transducer 412, orifice 410, and controls 414, 416, and 418. Primary fuel flow maintains a constant combustor pressure. Gas flow and secondary fuel flow are fixed. This will create a constant power system of one setting.

Figure 5:
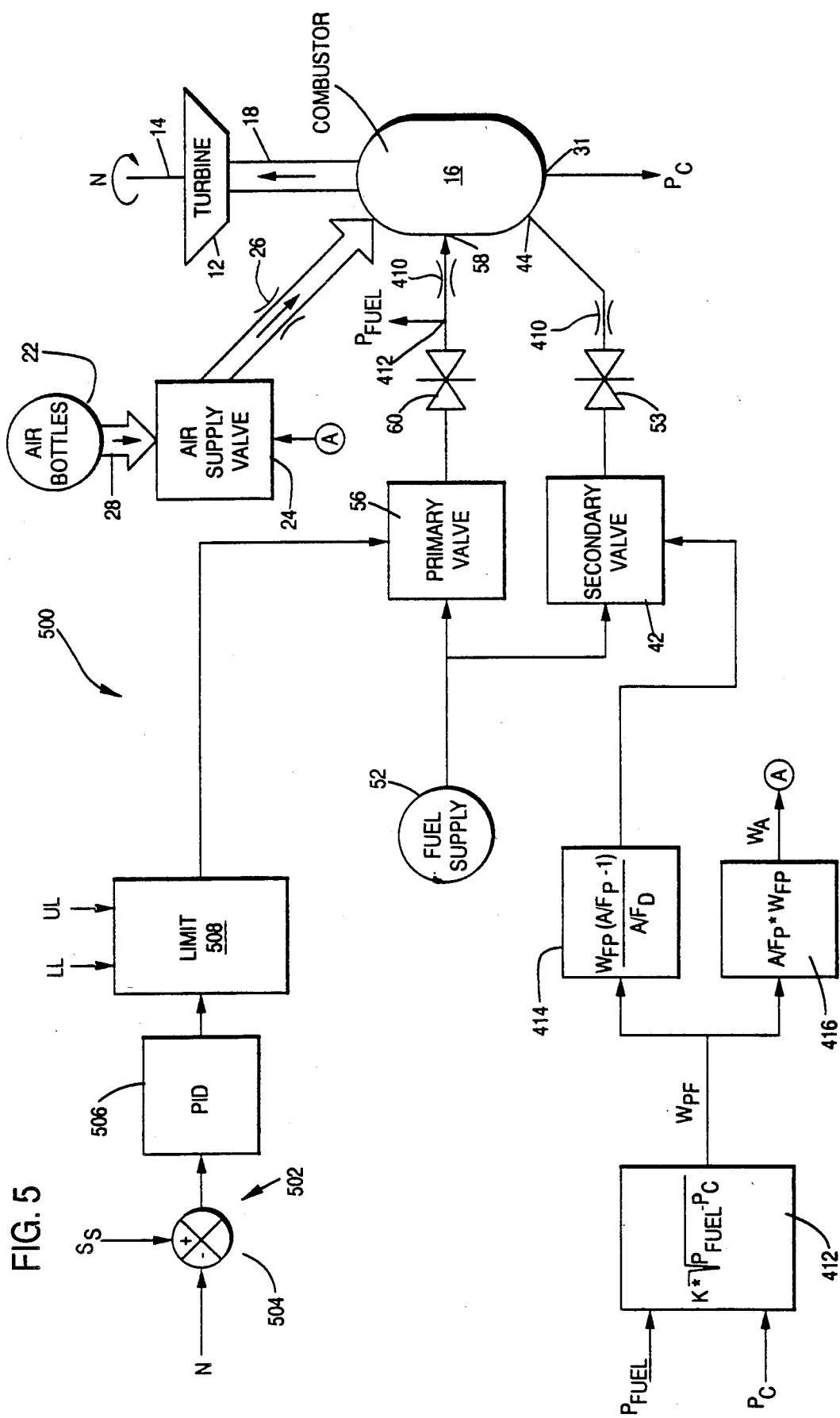
FIG. 5 illustrates a block diagram of a fifth embodiment of the present invention.

FIG. 5 illustrates a fifth embodiment 500 of the present invention. The fifth embodiment functions to control the rate of fuel flow to the primary valve 56 as the independent variable to produce a constant speed output on shaft 14 of turbine 12 for which a constant turbine inlet temperature TIT is required. Like reference numerals identify like parts in FIGS. 1–5. The embodiment of FIG. 5 differs from the embodiment is FIG. 4 only in that a constant speed control loop 502 has been substituted for the constant pressure control loop 402 of FIG. 4. The constant speed control loop 502 functions to produce a difference signal between a set speed $S_S$ provided by the system controller and an actual speed of rotation of the rotor 14 of the turbine 12. Subtractor 504 produces the error signal which is applied to PID controller 506. Limit circuit 508 limits the output of the PID circuit 506 between upper and lower limits.

Figure 6:
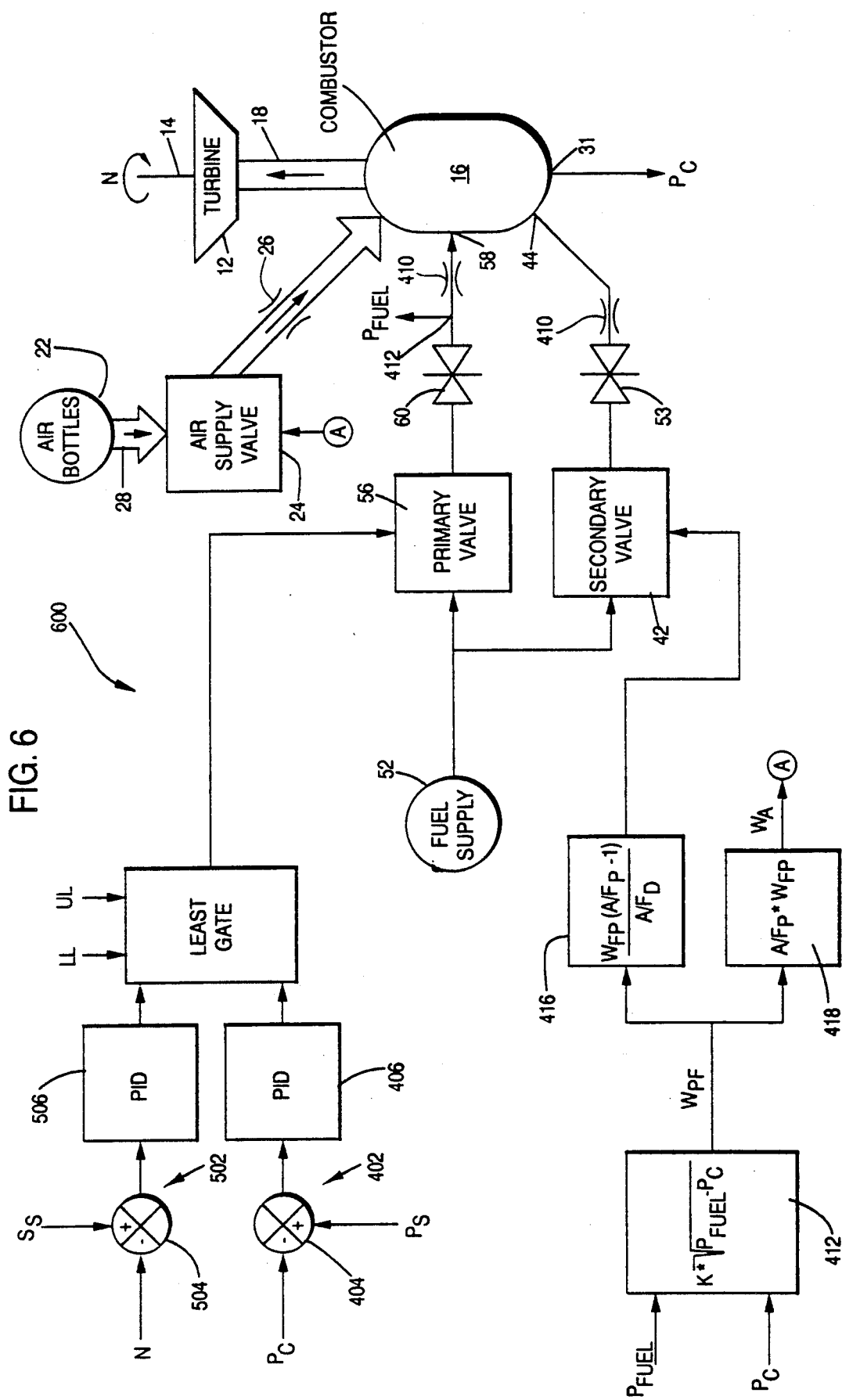
FIG. 6 illustrates a block diagram of a sixth embodiment of the present invention.

FIG. 6 illustrates a sixth embodiment 600 of the present invention. Like reference numerals identify like parts in FIGS. 1–6. The sixth embodiment functions identically to the embodiment of FIG. 3 in providing a constant speed mode of operation with acceleration of the turbine rotor up to the set speed $S_S$ being controlled by constant pressure control loop 402.

Embodiments 400, 500 and 600 could also use a constant temperature control method for controlling secondary fuel flow.

While the invention has been described in terms of its preferred embodiments it should be understood that numerous modifications may be made thereto without departing from the spirit of the present invention. For example, fuel where fuel flow measurement is required, a turbine flow meter or any other kind of flow measuring device may be used which does not require the use of restrictors. Furthermore, the gas control system in practice should utilize a restriction or other means to maintain constant air flow during ignition. At least one additional tertiary fuel injector may be used to further control the temperature of the exhaust gas stream impinging on the turbine rotor. It is intended that all such modifications fall within the scope of the appended claims.

We claim:

1. An airframe power unit for producing a power output comprising:

a combustor having a fuel injector which injects fuel into the combustor which is combusted to form a gas stream;

a turbine driven by the gas stream from the combustor for producing the power output;

a gas supply for providing pressurized gas containing oxygen blown down from a storage vessel to the combustor which is used in the combusting of the fuel;

a valve disposed in the gas supply which controls a rate of supply of gas to the combustor in response to a control signal applied to the valve to cause the turbine to operate with a constant operational characteristic;

means for providing at least one control value as an electrical signal with each value specifying a desired operational parameter for use in producing the constant operational characteristic;

means for sensing at least one operational parameter of the turbine;

means for producing the control signal as a function of a difference between the at least one control value as an electrical signal and a corresponding sensed operational parameter as an electrical signal with the sensed operational parameter being combustor pressure; and a fuel control controlling the rate of injection of fuel by the fuel injector into the combustor.

2. An airframe power unit in accordance with claim 1 wherein:

the combustor has a primary fuel injector for injecting fuel which is combusted in the combustor and a secondary fuel injector for injecting fuel into the gas stream to lower the gas stream temperature; and further comprising means for controlling the gas stream temperature to maintain a constant gas stream temperature into the turbine by controlling injection of fuel into the secondary fuel injector; and the at least one operational parameter further includes the sensed speed of rotation of the turbine, the at least one control value further includes a desired constant combustor temperature, and the operational characteristic is a constant power output from the combustor.

3. An airframe power unit in accordance with claim 1 wherein:

the power unit is an emergency power unit, the fuel is jet propulsion engine fuel, and the gas supply has at least one vessel storing compressed air.

4. An airframe power unit in accordance with claim 1 wherein:

the power unit is an integrated power unit, the fuel is jet propulsion engine fuel, and the gas supply has at least one vessel storing compressed air.

5. An airframe power unit in accordance with claim 2 wherein:

the power unit is an emergency power unit, the fuel is jet propulsion engine fuel, and the gas supply has at least one vessel storing compressed air.

6. An airframe power unit in accordance with claim 2 wherein:

the power unit is an integrated power unit, the fuel is jet propulsion engine fuel, and the gas supply has at least one vessel storing compressed air.

7. An airframe power unit in accordance with claim 1 further comprising:

a choked venturi disposed in the gas supply between the valve and the combustor;

a temperature sensor and a pressure sensor respectively for sensing temperature and pressure of gas flowing in the gas supply between the valve and the combustor; and wherein the fuel control comprises means, responsive to the sensed temperature and pressure, for calculating a gas to fuel ratio of the fuel injected by the injector and the gas flowing to the combustor and generating a control signal controlling a rate of fuel injection by the injector as a function of the calculated gas to fuel ratio to maintain a constant gas to fuel ratio.

8. An airframe power unit in accordance with claim 7 wherein:

the means for calculating and generating calculates a value for the equation $$\frac{P}{\sqrt{T}} \cdot K$$

which is a function of the control signal wherein P is the sensed pressure, T is the sensed temperature, K is a constant.

9. An airframe power unit in accordance with claim 2 further comprising:

a choked venturi disposed in the gas supply between the valve and the combustor;

a temperature sensor and a pressure sensor respectively for sensing temperature and pressure of gas flowing in the gas supply between the valve and the combustor; and wherein the fuel control comprises means, responsive to the sensed temperature and pressure, for calculating a gas to fuel ratio of the fuel injected by the primary injector and the gas flowing to the combustor and generating a control signal controlling a rate of fuel injection by the primary fuel injector as a function of the calculated gas to fuel ratio.

10. An airframe power unit in accordance with claim 9 wherein:

the means for calculating and generating calculates a value for the equation $$\frac{P}{\sqrt{T}} \cdot K$$

which is a function of the control signal wherein P is the sensed pressure, T is the sensed temperature, K is a constant.

* * * * *